US005817583A

United States Patent [19]

Alderson et al.

[11] Patent Number: 5,817,583

[45] Date of Patent: Oct. 6, 1998

[54] RADAR ATTENUATING TEXTILES

[75] Inventors: John Alderson; Alan F. Vickers, both of Colchester, United Kingdom

[73] Assignee: The Secretary of State for Defence in her Britannic Majesty's Government of the United Kingdom of Great Britain and Northern Ireland, United Kingdom

[21] Appl. No.: 436,430

[22] PCT Filed: Dec. 2, 1993

[86] PCT No.: PCT/GB93/02481

§ 371 Date: May 24, 1995

§ 102(e) Date: May 24, 1995

[87] PCT Pub. No.: WO94/13878

PCT Pub. Date: Jun. 23, 1994

[30] Foreign Application Priority Data

Dec. 4, 1992 [GB] United Kingdom .................. 9225444

[51] Int. Cl.[6] ........................ B32B 7/00

[52] U.S. Cl. .............. 442/38; 428/919; 442/58; 442/133; 442/288; 442/294

[58] Field of Search .................. 428/109, 110, 428/111, 229, 240, 242, 244, 247, 255, 919, 283, 117; 442/38, 58, 133, 288, 294, 919

[56] References Cited

FOREIGN PATENT DOCUMENTS

| | | |
|---|---|---|
| 1935636 | 1/1971 | Germany . |
| 2058469 | 4/1981 | United Kingdom . |
| 2237862 | 5/1991 | United Kingdom . |

*Primary Examiner*—James J. Bell
*Attorney, Agent, or Firm*—Nixon & Vanderhye

[57] ABSTRACT

Textile materials having radar attenuating properties based upon a polymer enclosed scrim having hollows which are at least partially filled with radar attenuating material. The scrim is sandwiched between two or more polymeric layers, the spaces being the interstices of the scrim. Suitable radar attenuating materials for inclusion in these spaces include carbon granules, carbon fiber, carbonyl iron, ferrites or metal coated microspheres. Carbon fiber is conveniently used in chopped or otherwise relatively short fiber form. The textiles offer lightweight with equivalent radar attenuation performance to known textiles and may include further radar attenuating material in polymeric components to provide enhanced attenuation effect.

19 Claims, 2 Drawing Sheets

RADAR ATTENUATING TEXTILES

The present invention relates to radar attenuating materials, particularly to radar attenuating textiles. A particular preferred application of the materials of the present invention in the provision of camouflage netting is also provided.

Radio detection and ranging (RADAR) techniques are widely used to track and identify objects as well as to provide ground mapping. Objects are detected because they interfere with radiowaves directed at them in a different way to their surroundings. Because these techniques are highly developed and provide accurate detection, even in poor weather conditions, there is a military need to provide camouflage against them.

A known method of doing this is to shape the object so as to greatly reduce the amount of radar reflecting off its surface in the direction of the receiver. The usefulness of this technique is limited by the need to know the exact direction of the incident radar. More effective methods of decreasing radar signals are those which seek to absorb and/or scatter the radiowaves. Such methods include 'Dual Absorbers' as described in WO 91/12173 and methods using a 'Gradient Of Electrical Properties' as described in U.S. Pat. No. 4,162.426.

One of the main problems in providing camouflage against radar is the need for the signals which reflect off a potential target to match those caused by the surrounding terrain. Another main problem in producing and using radar attenuating materials is the fact that they are heavy and difficult to fabricate. It is therefore desirable to provide a textile which is relatively lightweight, easy to manufacture, use and store, yet provides good attenuation. Typical attenuation achieved with known camouflage is of the order of 3 dB. It is a further aim of the present invention to provide a novel approach for increasing attenuation of known camouflage formats in a relatively simple fashion.

The present invention provides a textile material having radar attenuating properties comprising a polymer enclosed scrim formed of fibre bundles characterised in that the material comprises hollows between the bundles of the scrim which are at least partially filled with radar attenuating material.

In a preferred embodiment of the invention the scrim is sandwiched between two or more polymeric layers, wherein the hollows comprise the interstices of the scrim. In a further preferred embodiment of the invention the scrim is coated with a polymer and the spaces are formed in the polymer within the interstices of the scrim.

Conveniently the scrim is sandwiched between two polymeric layers and the sandwiched scrim is subjected to conditions under which the polymeric layers fuse and coat the scrim fibres. For example, suitable heat and/or pressure may be applied to the polymer such that it softens or melts. Alternatively adhesive may be used to cause the scrim and polymer to bind together.

The material of the scrim should be selected to match the end use of the radar attenuating material to be produced. Particularly preferred materials for military use will be durable and strong fabrics such as those made from man-made fibres such as nylon and/or other polymeric materials eg. polyesters.

The material of the enclosing polymer material will also be selected to match the end use. Particularly preferred materials will be those which provide good coating properties and which can be used to carry visual and/or infrared pigmentation, for example polyvinyl chloride.

In a still further embodiment of the invention there is provided a material as described above characterised in that it comprises a polymeric material containing a conductive fibre wherein the fibres are arranged to provide further radar attenuating effect. These fibres are arranged within a polymeric matrix and may comprise such materials as stainless steel or carbon; such arrangement being known to be capable of, inter alia, scattering radar signals. The fibres may be provided in the same polymeric material as that which encloses the scrim or may be within a further polymeric material in one or more outer layers applied to that. Alternatively any pigment containing polymeric material may be positioned in one or more further layers provided on top of the conductive fibre containing material.

Suitable radar attenuating materials for inclusion in the hollows include carbon granules, carbon fibre, carbonyl iron, ferrites or metal coated microspheres, but other suitable materials will occur to those skilled in the art. Carbon fibre is conveniently used in chopped or otherwise relatively short fibre form. Suitable fibre dimensions will include, inter alia, lengths approximating the wave —length of the radar to be attenuated.

Materials of the present invention will now be exemplified by way of illustration only by reference to the following examples. Further embodiments of the invention will occur to those skilled in the art in the light of these.

Example 1

Figure 1:
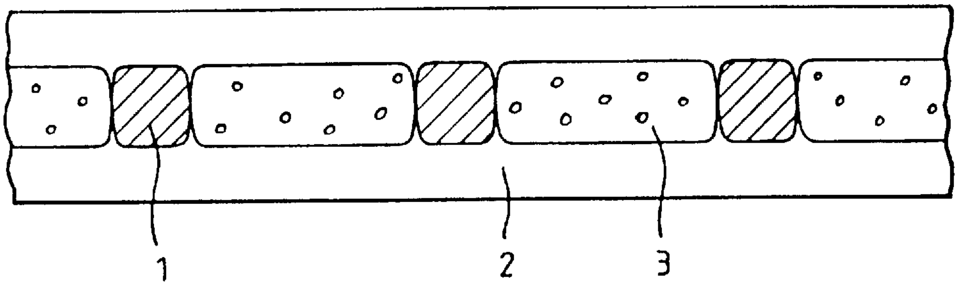
FIG. 1 shows a cross section through a radar attenuating textile material of the invention as described further in Example 1.
Figure 4:
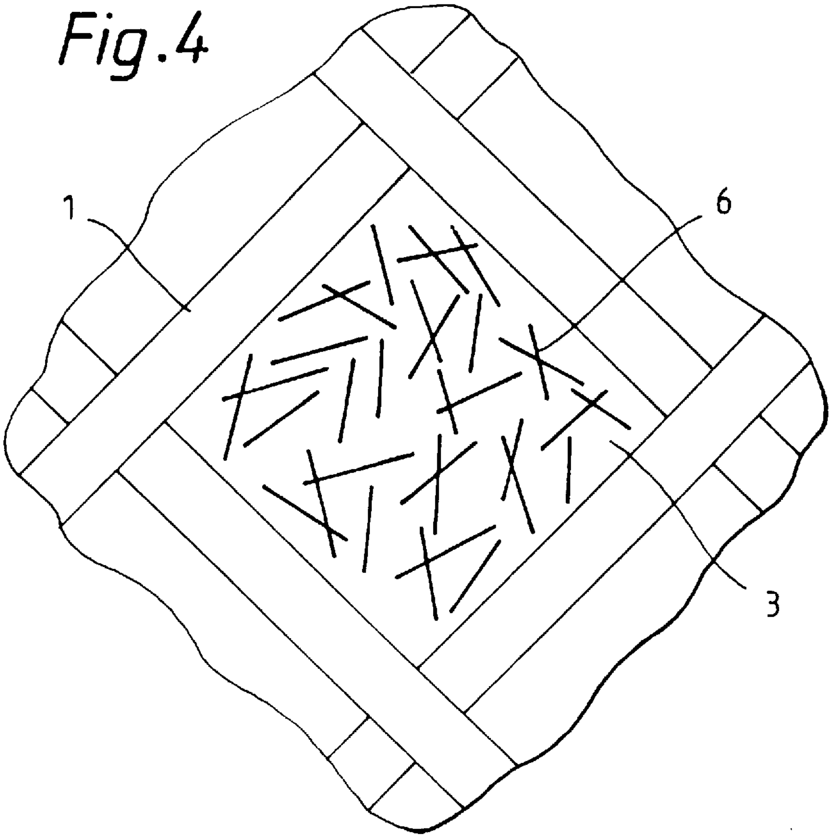
FIG. 4 shows a diagrammatic plan view of the scrim layer of a radar attenuating textile material of the invention as described in Example 1.

A radar attenuating textile material of the present invention is provided as shown in FIG. 1 wherein a polyester scrim (1) is enclosed by a polyvinylchloride layer (2), containing conductive fibres of carbon and/or stainless steel. An outer polymeric layer (3) includes visual and infrared pigmentation providing the textile with visual camouflage. Hollows provided by the interstices of the scrim (4) contain chopped carbon fibre (6) as radar attenuating agent, as shown more clearly in the plan view of FIG. 4.

Example 2

Figure 2:
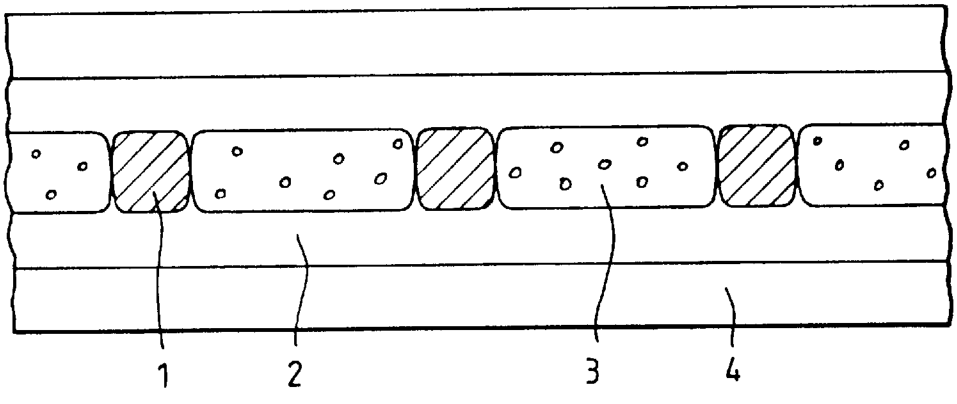
FIG. 2 shows a cross section through a radar attenuating textile material of the invention as described further in Example 2.

A radar attenuating textile material of the present invention is provided as shown in FIG. 2 wherein a nylon scrim (1) is enclosed by a polyvinylchloride layer (2) containing conductive fibres of stainless steel as a first radar attenuating agent. Hollows provided by interstices of the scrim (4) contain chopped carbon fibre as second radar attenuating agent. Use of two attenuators in this or similar manner offers attenuation over a wider frequency range than use of one agent alone.

Example 3

Figure 3:
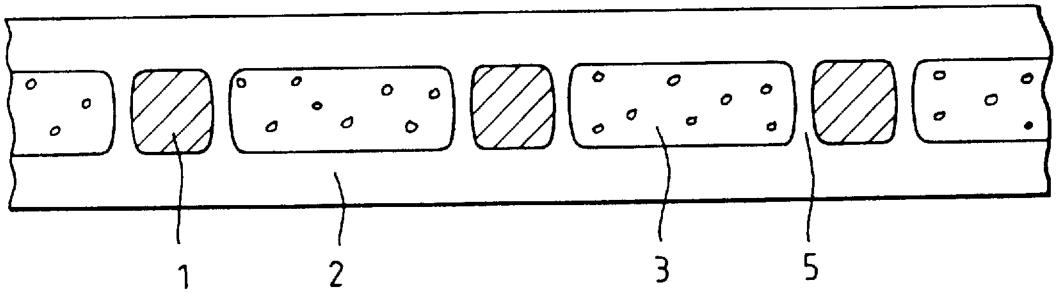
FIG. 3 shows a cross section through a radar attenuating textile material of the invention as described further in Example 3.

A radar attenuating textile material of the present invention is provided as shown in FIG. 3 wherein a polyester scrim (1) is enclosed by a polyvinylchloride layer (2) which has been heated such that it is melted around the bundles of yarn of the scrim at regions bordering the scrim interstices (5). The hollows provided by the interstices (3) contain radar attenuating chopped carbon fibre.

Example 4

A radar attenuating material as described in Example 1 was produced as follows. A polyester scrim was placed upon a sheet of polyvinylchloride. An excess of finely chopped carbon fibre radar attenuating material was added in order to fill the interstices of the scrim and after any radar attenuating material remaining on the surface of the scrim was removed a second sheet layer of polyvinylchloride was added. The resulting material was then subjected to heat and pressure, using heated rollers, such that the polyvinylchloride was softened sufficient to impregnate the scrim but not to flow into the interstices and coat the carbon fibre.

Example 5

Two radar attenuating materials, of fine and coarse mesh size respectively formed as described in Example 3 were assessed for attuation properties as compared with standard scrim nets of similar materials without the added carbon fibre in the hollows between the net interstices. The fine mesh had interstices of about 1 mm square while the coarse mesh had interstices of about 5 mm square. The carbon fibre was chopped to lengths between 1 and 3 mm with smaller lengths used in the fine mesh. A GHz spot frequency emitter was used as radar source and scrims were placed over a flat metal reflector.

With fine mesh contacting the reflector between 0.1 and 0.4 dB attenuation depending on orientation to sorce was achieved, while coarse mesh gave between 2 and 5 dB attenation.

We claim:

1. A textile material having radar attenuating properties comprising a polymer enclosed scrim formed of fibre bundles the material having hollows between the bundles of the scrim which are at least partially filled with radar attenuating material, the scrim being either sandwiched between two or more polymeric layers and the hollows are formed of the interstices provided between the bundles of the scrim or wherein the scrim is coated with a polymer and the hollows are formed in the polymer, wherein the radar attenuating material is particulate and is confined to be present exclusively within the hollows.

2. A textile material as claimed in claim 1 wherein the radar attenuating material for inclusion in the hollows is selected from carbon granules, carbon fibres, carbonyl iron, ferrites and/or metal coated microspheres.

3. A textile material as claimed in claim 1 wherein the scrim is coated with the polymer.

4. A textile material as claimed in claim 1 wherein the scrim is sandwiched between two polymeric layers and the resultant structure is subjected to conditions under which the polymeric layers fuse and coat the scrim bundles.

5. A textile material as claimed in claim 4 wherein heat and/or pressure have been applied to the polymer such that it softens or melts about the bundles.

6. A textile material as claimed in claim 2, wherein the polymeric layers are bound to the scrim using an adhesive.

7. A textile material as claimed in claim 1, wherein the scrim comprises a man made fibre.

8. A textile material as claimed in claim 7 wherein the scrim comprises nylon and/or other polymeric materials.

9. A textile material as claimed in claim 8 wherein the other polymeric material is a polyester.

10. A textile material as claimed in claim 1 wherein the enclosing polymer enhances scrim coating properties.

11. A textile material as claimed in claim 1 wherein the enclosing polymer it is capable of carrying visual and/or infrared pigmentation.

12. A textile material as claimed in claim 10 wherein the enclosing polymer comprises polyvinyl chloride.

13. A textile material as claimed in claim 1 further containing a polymeric material containing a conductive fibre wherein the fibres are arranged to provide further radar attenuating effect to those in the hollows.

14. A textile material as claimed in claim 13 wherein the conductive fibres are arranged within a polymeric matrix.

15. A textile material as claimed in claim 14 wherein the conductive fibres comprise stainless steel or carbon.

16. A textile material as claimed in claim 13 wherein the polymeric material encloses the scrim.

17. A textile material as claimed in claim 13 wherein the polymeric material is a further polymeric material in one or more outer layers applied to the polymeric material that encloses the scrim.

18. A textile material as claimed in claim 13 wherein a pigment containing polymeric material is positioned in one or more further layers provided on top of the conductive fibre containing material and/or the polymeric material that encloses the scrim.

19. A textile material as claimed in claim 1 wherein the radar attenuating material for inclusion in the hollows comprises carbon fibre in chopped or otherwise relatively short fibre form.

* * * * *